(12) United States Patent
Pusic

(10) Patent No.: US 6,168,000 B1
(45) Date of Patent: Jan. 2, 2001

(54) HYDRAULIC ROTARY CLUTCH

(76) Inventor: Pavo Pusic, 52 Brooklake Rd., Florham Park, NJ (US) 07932

( * ) Notice: Under 35 U.S.C. 154(b), the term of this patent shall be extended for 0 days.

(21) Appl. No.: 09/467,225

(22) Filed: Dec. 20, 1999

Related U.S. Application Data

(60) Provisional application No. 60/114,118, filed on Dec. 30, 1998.

(51) Int. Cl.$^7$ .................................................. F16D 31/00
(52) U.S. Cl. ........................................ 192/58.2; 192/58.91
(58) Field of Search ................................ 192/58.2, 58.3, 192/58.9, 58.91, 60

(56) References Cited

U.S. PATENT DOCUMENTS

| | | | |
|---|---|---|---|
| 1,463,975 | * | 8/1923 | Scotford ................................ 192/60 |
| 1,840,161 | * | 1/1932 | Graser ................................... 192/60 |
| 1,901,241 | * | 3/1933 | Higby et al. ......................... 192/58.9 |

* cited by examiner

*Primary Examiner*—Richard M. Lorence

(57) ABSTRACT

A hydraulically operated rotary clutch includes a housing, a triangular rotor, an input gear, an eccentric shaft, a main shaft, a shifting piston, and a mechanism to operate the shifting piston. The rotor orbits in an inner elliptical opening of the housing and forms fluid chambers which are filled with a hydraulic fluid. The hydraulic fluid circulates through fluid passages which extend between all fluid chambers when the shifting piston is positioned to allow such fluid circulation, thereby resulting in a disengagement of a drive and driven member. When the shifting piston is driven to restrict the fluid circulation, the driving force is gradually applied to the driven member. A full-scale power flow is reached when the shifting piston is positioned to completely cut off the fluid circulation between the fluid chambers and when the force exerted by the drive member is transmitted through the fluid onto the driven member.

17 Claims, 16 Drawing Sheets

HYDRAULIC ROTARY CLUTCH

This application claims benefit to provisional Application 60/114,118 filed Dec. 30, 1998.

BACKGROUND OF THE INVENTION

A clutch is a friction device used to connect and disconnect a driving force from a driven member. The clutch is designed to provide smooth and positive engagement and disengagement of the engine and manual transmission in engine-powered vehicles. The clutch provides the necessary linkup of the engine and drivetrain that pen-nits power transfer to the driving axles and wheels as well as the necessary halt to power transfer that allows the engine to operate while the transmission does not. Generally speaking, clutch designs can be defined either as a single-plate or multiple-plate design. The single-plate design comprises the driven plate assembly and the pressure plate assembly while the multiple-plate design comprises a plurality of clutch plates and a plurality of friction discs.

The clutches in the prior art are relatively complex devices and have to be precisely mounted and always kept properly aligned to prevent slippage, vibration, and noise. Since they have to sustain a significant clamping force, the clutches are also very susceptible to wear and tear. Consequently, any improper driver's action inevitably results with a clutch damage.

SUMMARY OF THE INVENTION

It is an object of the present invention to provide a clutch which will connect and disconnect the driving force between drive and driven members by using a hydraulic fluid to provide a gradual application of force and a rapid halt of power transfer. Consequently, the present invention will eliminate the need to develop friction between relatively hard surfaces and, thereby, enable much smoother engagement of the engine and transmission. It will also minimize the possibility for any wear and tear and eliminate the need for adjusting maintenance. In comparison with the clutches hi the prior art, this design has much simpler physical configuration, lower weight, and smaller volume.

One embodiment of the present invention comprises one triangular rotor, an elliptical housing, an eccentric shaft, a main shaft, a power input gear, and a shifting mechanism. The rotor is enclosed within the housing and mounted onto the eccentric shaft which is firmly connected to the input gear. The eccentric shaft is further mounted onto the main shaft while the shifting mechanism is located within a central opening in the main shaft. The shifting mechanism comprises a shifting piston, a retracting spring, and a push rod which is operated by a lever arm connected to a clutch lever. A plurality of lockup balls are also provided within the main shaft and a plurality of fluid passages are provided within the rotor, the eccentric shaft, and the main shaft. Hydraulic fluid is provided around the rotor within the housing and within the fluid passages.

According to the process of the present invention, the rotor orbits around the eccentric shaft within the housing and serves as a power input member. The elliptical motion of the rotor alternately creates fluid chambers whose volume either increase or decrease in dependence to the rotor's positions. Since the rotor's orbiting permanently increases the volume of some fluid chambers and decreases the volume of other fluid chambers, the hydraulic fluid is permanently displaced from the disappearing fluid chambers and flows in the newly created fluid chambers. The fluid passages are designed so as to provide a fluid communication between all fluid chambers and this communication can be cut only by the shifting piston. Thus, when the piston is positioned to allow the unrestricted flow of fluid, the rotor is able to transfer the fluid from one chamber to another and the power flow is completely cut off.

When the piston is moved to restrict the fluid flow between the chambers and passages, the fluid starts being trapped between piston lobes and housing walls. This, in turn, causes the fluid pressure to increase and exert the force onto the housing walls thereby transmitting the driving force to the housing and forcing the housing to rotate in the same direction as the rotor. Since the housing is firmly connected to the main shaft, the driving force is further transmitted to this shaft which extends into the transmission.

As the piston moves to block more fluid passages, the fluid circulation is more and more restricted and the fluid pressure is more and more increased. This results in more and more driving force transmitted to the housing which, in turn, increases the housing's rotating speed. When the piston comes in the position where it completely covers all fluid passages, the fluid circulation is completely cut off and the housing is forced to rotate at the same speed as the rotor. At this instant, a full-scale power flow is established between the drive and driven members and a mechanical lock-up between the main shaft and the eccentric shaft is performed by lock-up balls as described later in the description of the preferred embodiment.

As soon as the piston is moved back and it uncovers a section of the fluid passages, the fluid circulation is enabled again and the fluid pressure starts to drop. The smaller fluid pressure acting against the housing's walls results in smaller driving force transmitted to the housing. Consequently, the housing starts to rotate slower than the rotor and the power flow is cut off when the piston again uncovers all of the fluid passages and enables unrestricted flow of fluid.

Yet another embodiment of the present invention comprises one triangular rotor, an elliptical housing, an eccentric shaft, a main shaft, a power input gear, and a shifting mechanism. The rotor is enclosed within the housing and mounted onto the eccentric shaft which is firmly connected to the input gear. The eccentric shaft is further mounted onto the main shaft while a plurality of fluid passages are provided through the housing's walls. The hydraulic fluid is provided around the rotor within the housing and within the fluid passages. Two fluid valves are provided in the housing's walls and they intersect the fluid passages.

According to the process of the present invention in the second embodiment, the rotor orbits around the eccentric shaft within the housing and serves as a power input member as described above for the first embodiment. The entire chamber forming and fluid displacing process is identical as described above and the fluid passages are designed to provide fluid communication between all fluid chambers. The housing is also finally connected to the main shaft and serves as the output member. The fluid valves are designed to either allow or restrict the flow of fluid through the fluid passages and, thereby, either enable or prevent the flow of fluid between the fluid chambers.

When the valves are in their opened positions, they do not influence the flow of fluid which enables the rotor to transfer the fluid from one chamber to another. This results in the unrestricted flow of fluid and the power flow is completely cut off. When the valves start closing the fluid passages, they start restricting the flow of fluid between the chambers and passages and the fluid starts being trapped between piston lobes and housing walls. This, in turn, causes the fluid pressure to increase and exert the force onto the housing walls thereby transmitting the driving force to the housing and forcing the housing to rotate in the same direction as the rotor.

Further closing of the valves causes more and more restricted fluid circulation and more and more increased fluid pressure. This results in more and more driving force transmitted to the housing which, in turn, increase the housing' rotating speed. When the valves are completely closed, the fluid circulation is completely cut off and the housing is forced to rotate at the same speed as the rotor thereby providing the full-scale power flow.

As soon as the valves start to open again, the fluid circulation is enabled and the fluid pressure starts to drop. As described for the previous embodiment, the smaller fluid pressure acting against the housing's walls results in smaller driving force transmitted to the housing. Consequently, the housing starts to rotate slower than the rotor and the power flow is cut off when the valves are completely open and the unrestricted flow of fluid is allowed through all of the fluid passages.

All features and advantages of the present invention will become apparent from the following brief description of the drawings and the description of the preferred embodiment.

DETAILED DESCRIPTION OF THE PREFERRED EMBODIMENT

Figure 1:
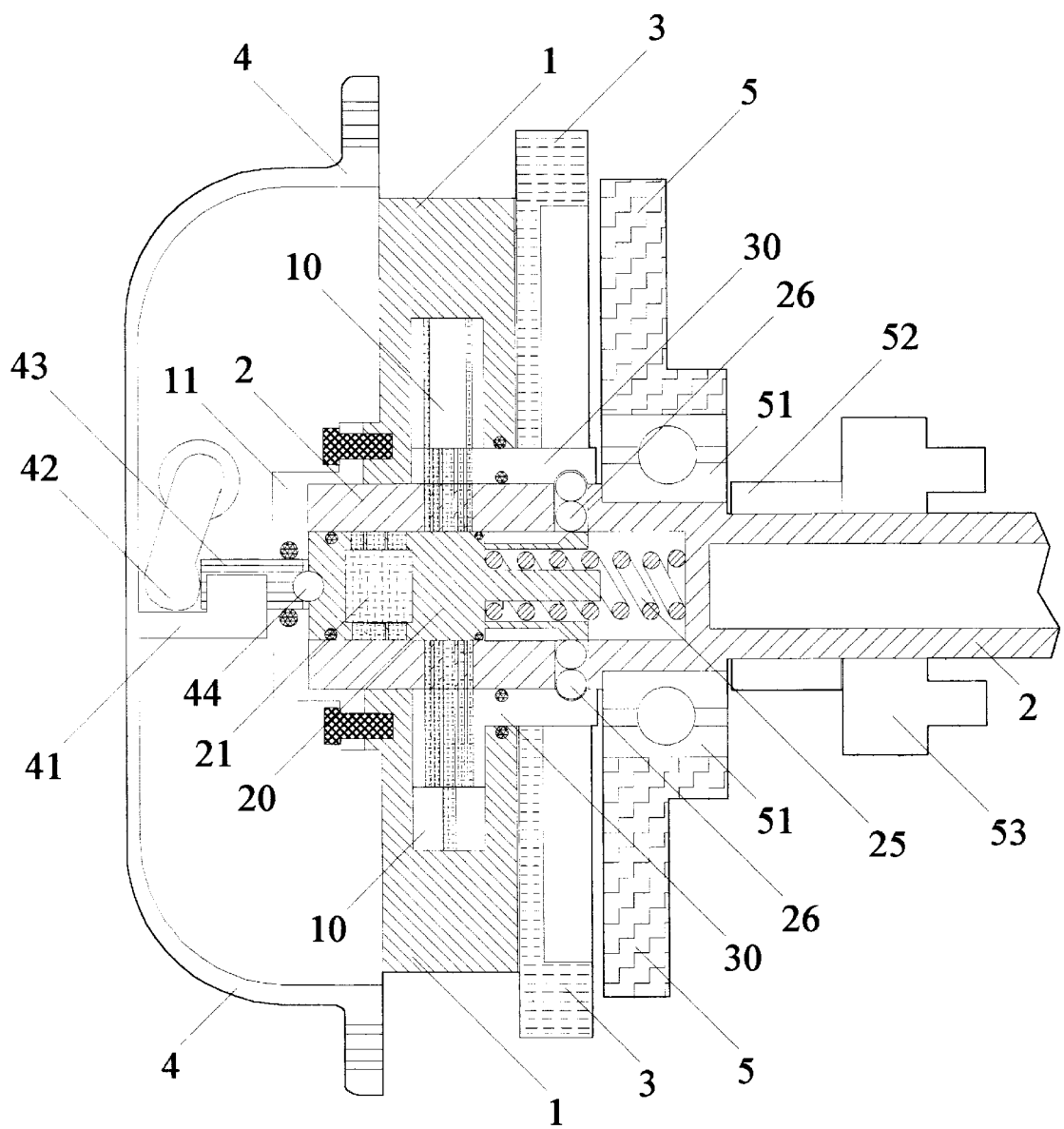
FIG. 1 is the rear cut-away view of the invention showing the arrangement of all drive, driven, and shifting members and their positions with respect to an adjacent transmission.

As shown in FIG. 1, the present invention comprises a housing 1, a rotor 10, an input gear 3, an eccentric shaft 30, a main shaft 2, a shifting piston 20, a retracting spring 25, a plurality of lock-up balls 26, a contact ball 44, a main shaft's cover 11, a push rod 43, and a lever arm 42. As also shown in FIG. 1, the entire invention is located next to a transmission cover/holder 5 wherein the main shaft 2 extends through the cover/holder into a transmission. The main shaft 2 is enclosed by a ball bearing 51 in the cover/holder and transmission drive gears 52 and 53 are also mounted on this shaft 2 as shown in FIG. 1. On the opposite side the invention is enclosed by a clutch cover 4 which comprises a push rod's sleeve as shown in FIG. 1.

Figure 2:
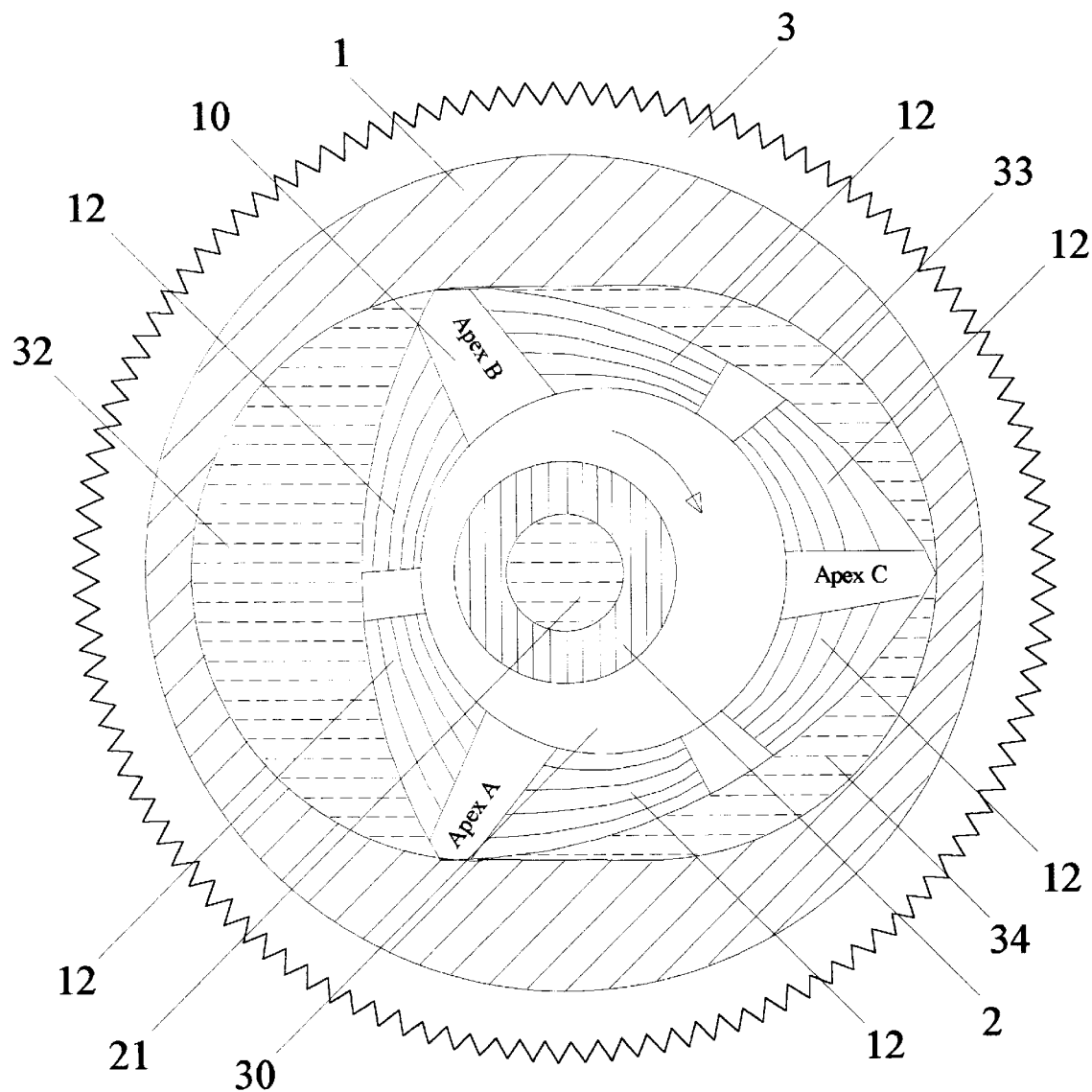
FIG. 2 is the side cut-away view of the rotor, the elliptical housing, the fluid chambers, the input gear, the eccentric shaft, and the main shaft in the position defined as "zero degrees" of the rotor's rotation.
Figure 5:
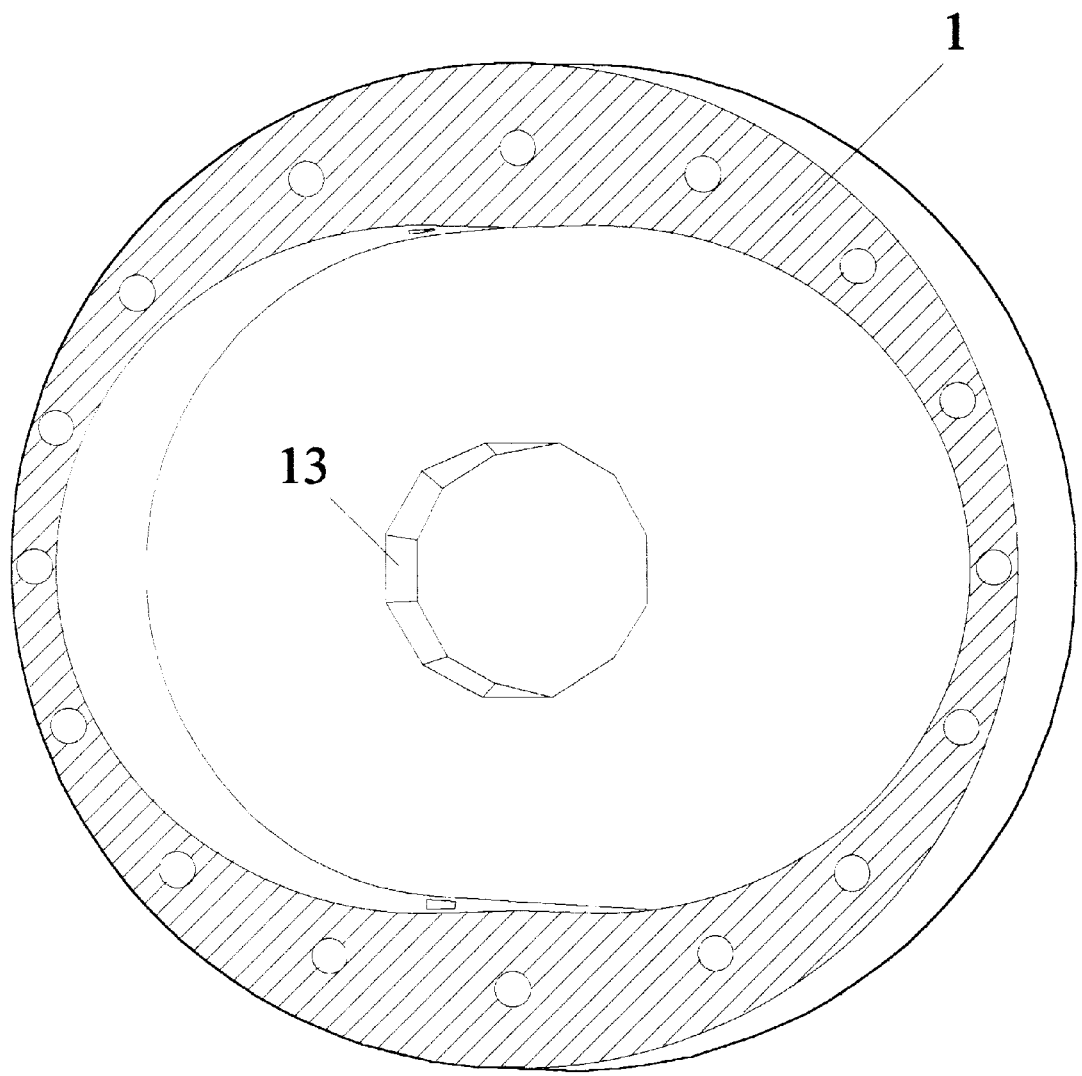
FIG. 5 is the cut-away view of the elliptical housing.

As shown in FIGS. 2 and 5, the housing 1 of the present invention has an oval internal opening known from the prior art and applied in a rotary (Wankel) engine. As shown in FIG. 2, this opening houses the triangular rotor 10 which orbits within the opening as shown in FIGS. 2A, 2B, 2C, and 2D. The housing has two central openings in its side walls and the eccentric shaft 30 extends through one of these openings as shown in FIG. 1. The other opening 13, shown in FIG. 5, is made in a manner which enables the housing to be connected to the end section of the main shaft 2 and ensures that they always rotate together.

Figure 3:
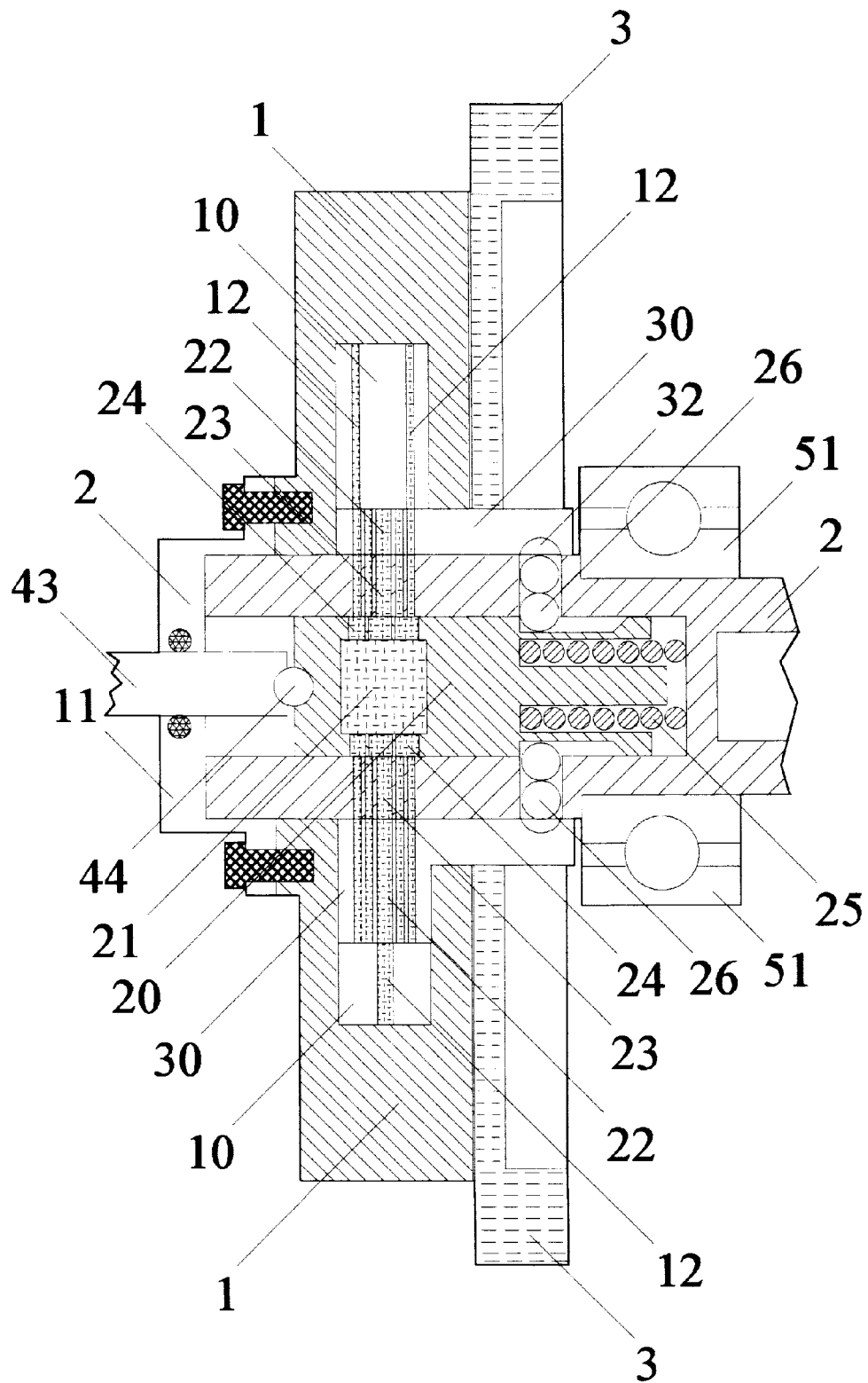
FIG. 3 is the rear cut-away of the invention showing the position of the shifting assembly when the clutch is completely disengaged.
Figure 4:
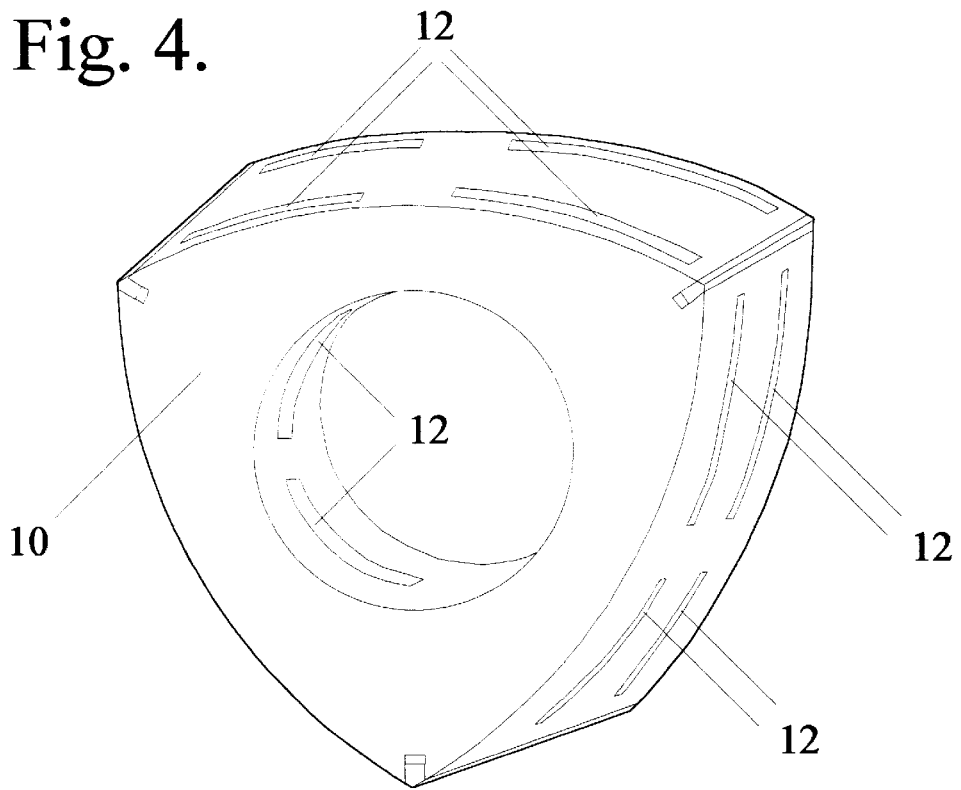
FIG. 4 is the perspective view of the rotor.
Figure 4A:
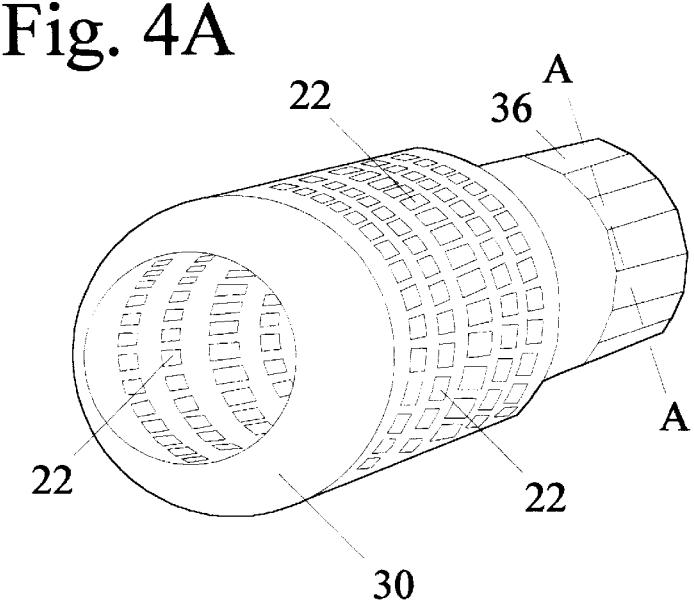
FIG. 4A is the perspective view of the eccentric shaft.
Figure 7:
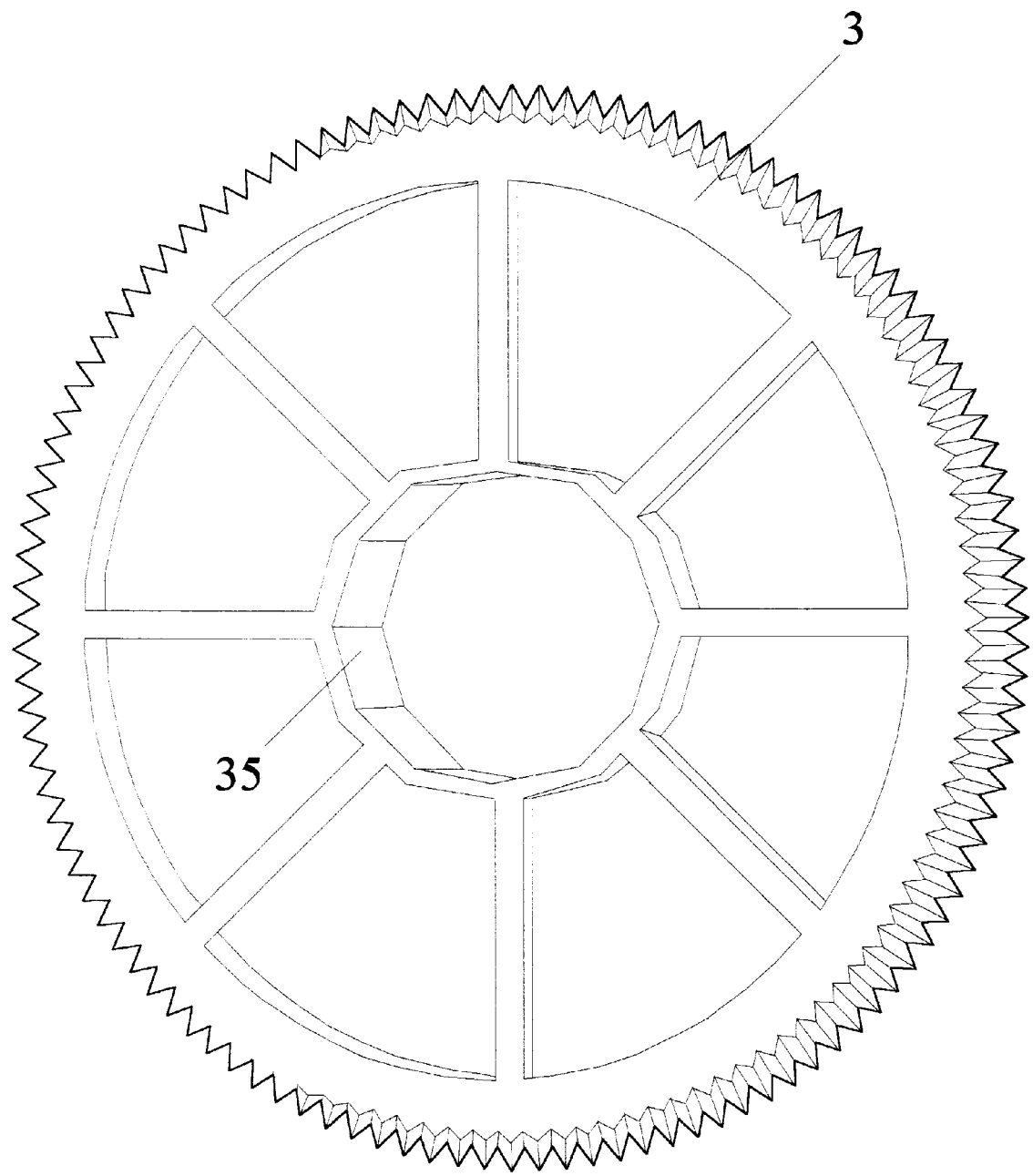
FIG. 7 is the perspective view of the input gear.

As shown in FIGS. 1, 2, and 3, the rotor 10 is mounted onto the eccentric shaft 30. A plurality of fluid passages 12 are provided within the rotor 10 and they 12 connect the rotor's lobes and its central opening as shown in FIG. 4. The eccentric shaft, shown in FIGS. 1, 2, 3, and 4A, is mounted onto and rotates around the main shaft 2. As shown in FIGS. 1, 2, and 3, the rotor 10 is mounted onto the eccentric shaft 30 which forces the rotor 10 to orbit around the elliptical opening in the housing 1. The eccentric shaft also has fluid passages 22 which connect its outer circumference and its central opening as shown in FIG. 4A. As also shown in FIG. 4A, one end of the eccentric shaft 36 is made to fit into the opening 35 in the input gear 3, shown in FIG. 7, and provide a firm connection between the eccentric shaft 30 and the input gear 3 which ensures that they always turn together as required by the process of the invention.

Figure 6:
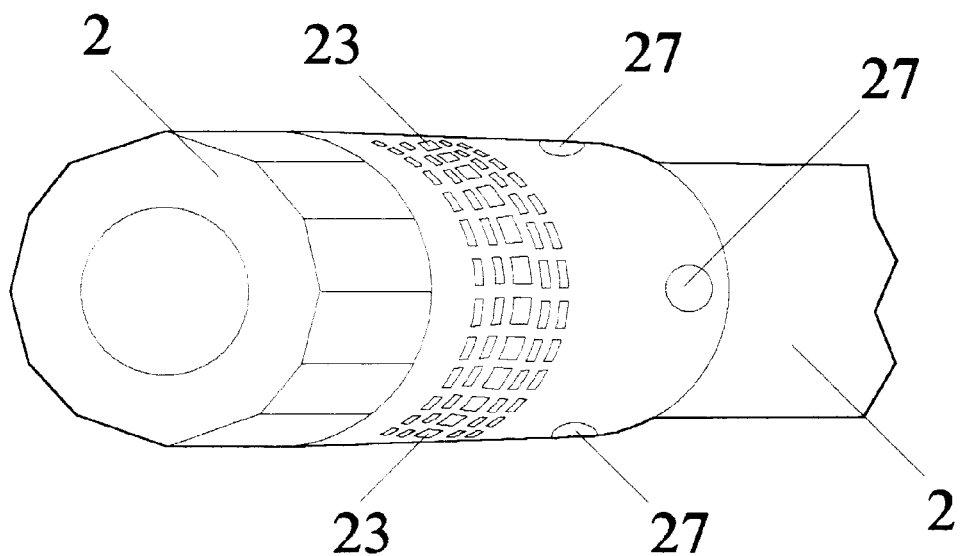
FIG. 6 is the perspective view of the main shaft.

The main shaft 2 extends through the eccentric shaft 30 and one end of the housing 1 as shown in FIG. 1 and 3. As shown in FIGS. 1, 2, 3, the main shaft 2 has a central opening which houses the shifting piston 20 and the retracting spring 25. The main shaft 2 also has a plurality of fluid passages 23 which connect its outer circumference and its inner opening as shown in FIG. 6. As shown in FIGS. 1, 3, and 6, this shaft 2 also has a plurality of radial openings 27 which house the contact balls 26. On the side opposite to the transmission, the main shaft 2 is enclosed by the shaft cover 11 which is also connected to the housing as shown hi FIGS. 1 and 3.

Figure 3A:
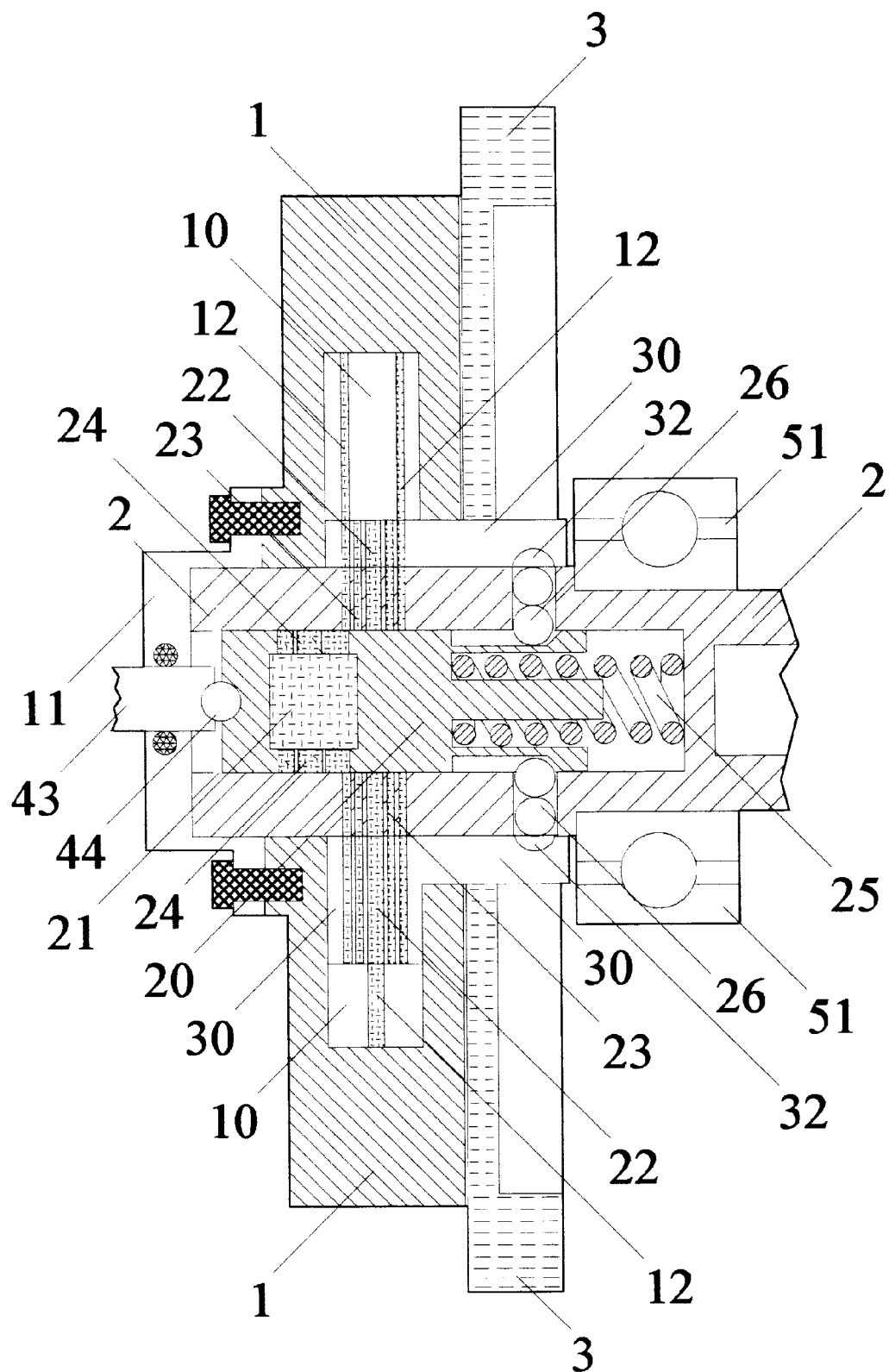
FIG. 3A is the rear cut-away of the invention showing the position of the shifting assembly when the clutch is partially engaged.
Figure 3B:
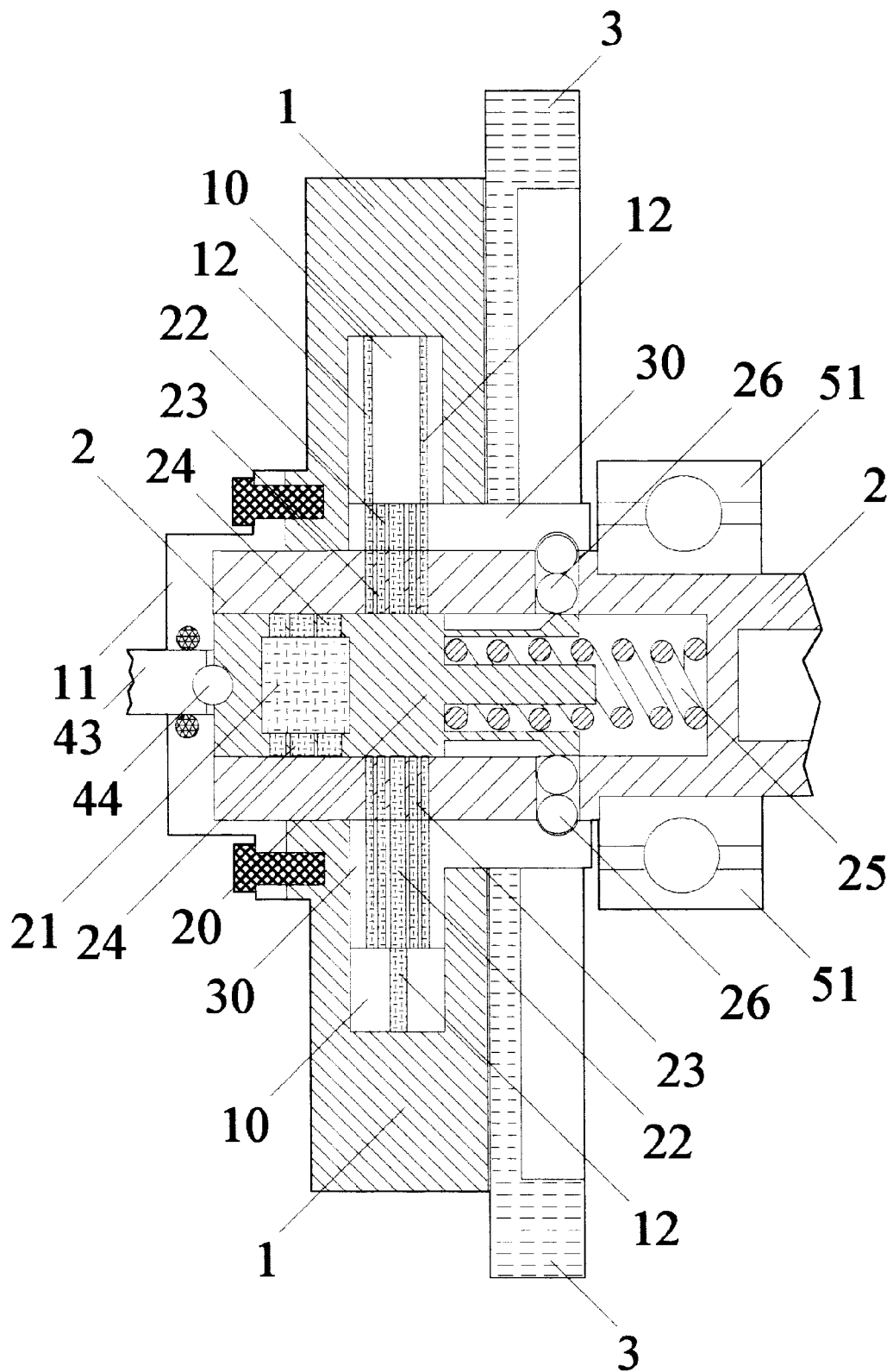
FIG. 3B is the rear cut-away of the invention showing the position of the shifting assembly when the clutch is completely engaged.
Figure 6A:
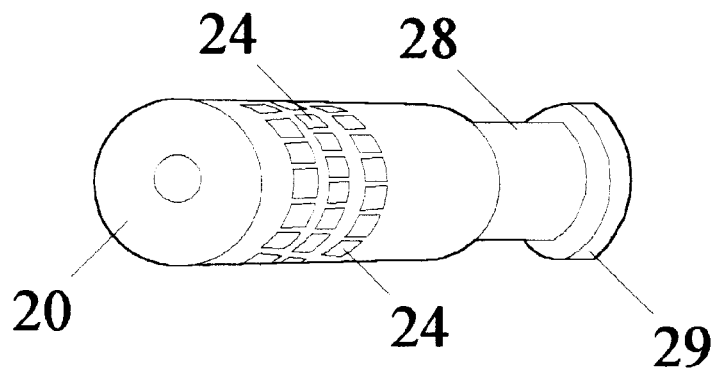
FIG. 6A is the perspective view of the shifting piston.

The shifting piston 20 is located within the central opening of the main shaft 2 and attached to the retracting spring 25 as shown in FIGS. 1 and 3. As shown in FIGS. 1, 2, and 3, the shifting piston 20 has a central opening 21 which is adjacent to the fluid passages 24 which extend from the opening 21 to the outer circumference of the piston 20 as also shown in FIGS. 1, 3, and 6A. The piston has a depressed section 28 and raised section 29 as shown in FIG. 6A, wherein the depressed section 28 houses the lock-up balls 26 as shown in FIGS. 3 and 3A, and the raised section 29 displaces the lock-up balls 26 as shown in FIG. 3B. As shown in FIGS. 1 and 3, the contact ball 44 is provided between the piston 20 and the push rod 43 in order to diminish a friction between these two members 20 and 43 when the piston 20 is rotating and the push rod 43 is stationary. The lever arm 42 is connected to a lever clutch and located next to the push rod 43 as shown in FIG. 1.

The following description of the process of the present invention assumes that the power generated by an engine is exerted onto the input gear 3 which meshes with a gear connected to the engine crankshaft as in the existing motorcycle clutches. However, it is to be understood that the process of the present invention is performed in the identical manner if the power generated by the engine is applied directly from the engine crankshaft/flywheel to the eccentric shaft 30 as in the case of the engines used in four-wheel vehicles. For the purpose of the following description, it is also assumed that the shifting piston 20 is in its ultimate inward position as shown in FIG. 3. When a rotational force is applied onto the input gear 3, this gear 3 starts to rotate and forces the eccentric shaft 30 at the same speed. The eccentric shaft 30 further forces the rotor 10 to rotate within the elliptical opening of the housing 1.

As known from the prior art, it takes three revolutions of the eccentric shaft to force the rotor to make one revolution as shown in FIGS. 2A, 2B, 2C, and 2D. As shown in FIG. 2, three fluid chambers 32, 33, and 34 exist around the rotor 10 inside the elliptical opening in the housing 1. These fluid chambers 32, 33, and 34 are filled with fluid which also fills all of the fluid passages and the opening 21 in the shifting piston. The rotor's position depicted in FIG. 2 represents the starting position for the following description of the fluid displacement process in the present invention. As depicted in FIGS. 2A, 2B, 2C, and 2D, at the point when the volumes of the fluid chambers 31 and 33 start decreasing (after reaching their maximum volumes), they become the chambers 32 and 34 respectively.

Figure 2A:
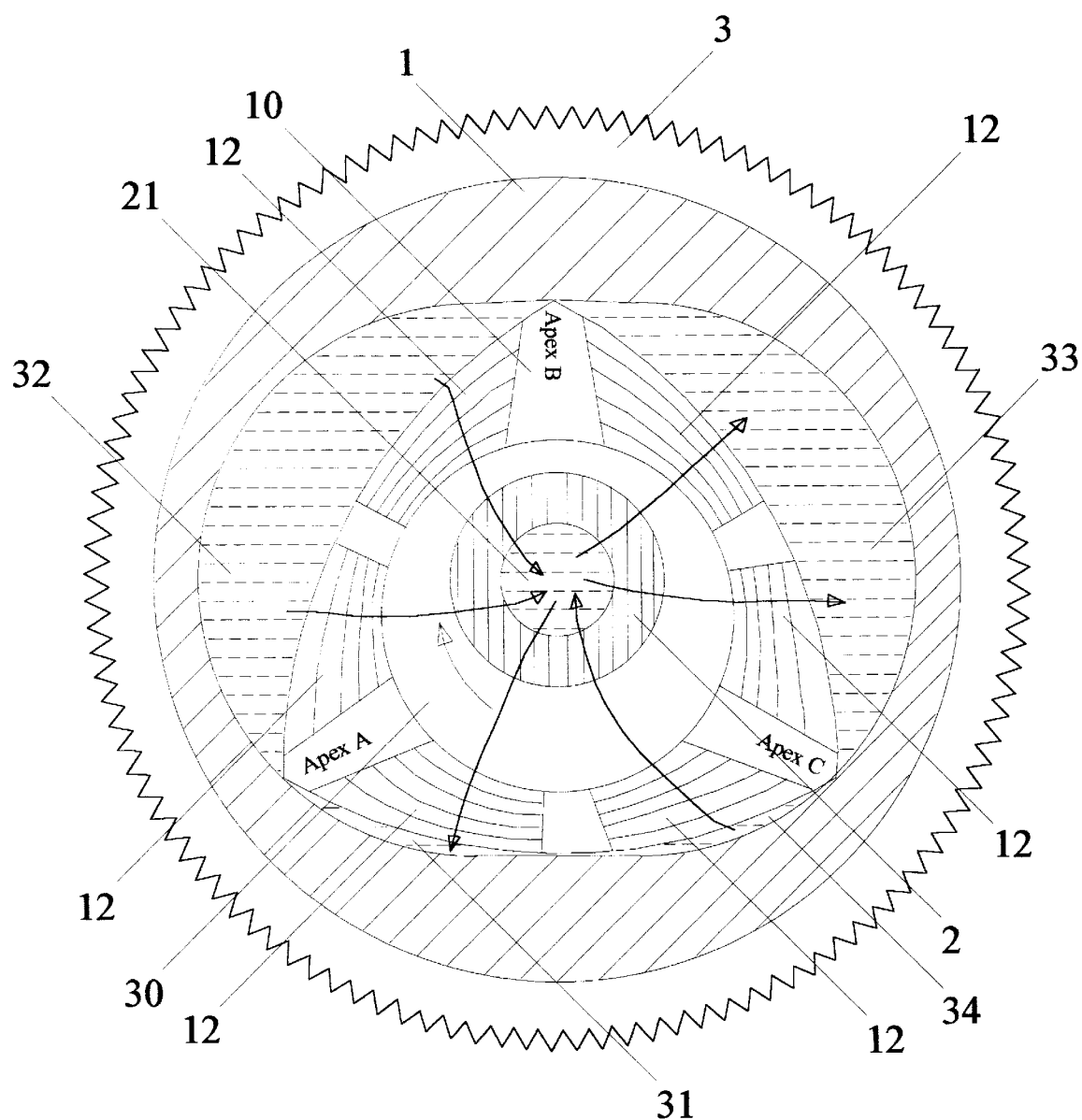
FIG. 2A is the side cut-away view of the rotor, the elliptical housing, the fluid chambers, the input gear, the eccentric shaft, and the main shaft in the position defined as "90 degrees" of the rotor's rotation.
Figure 2B:
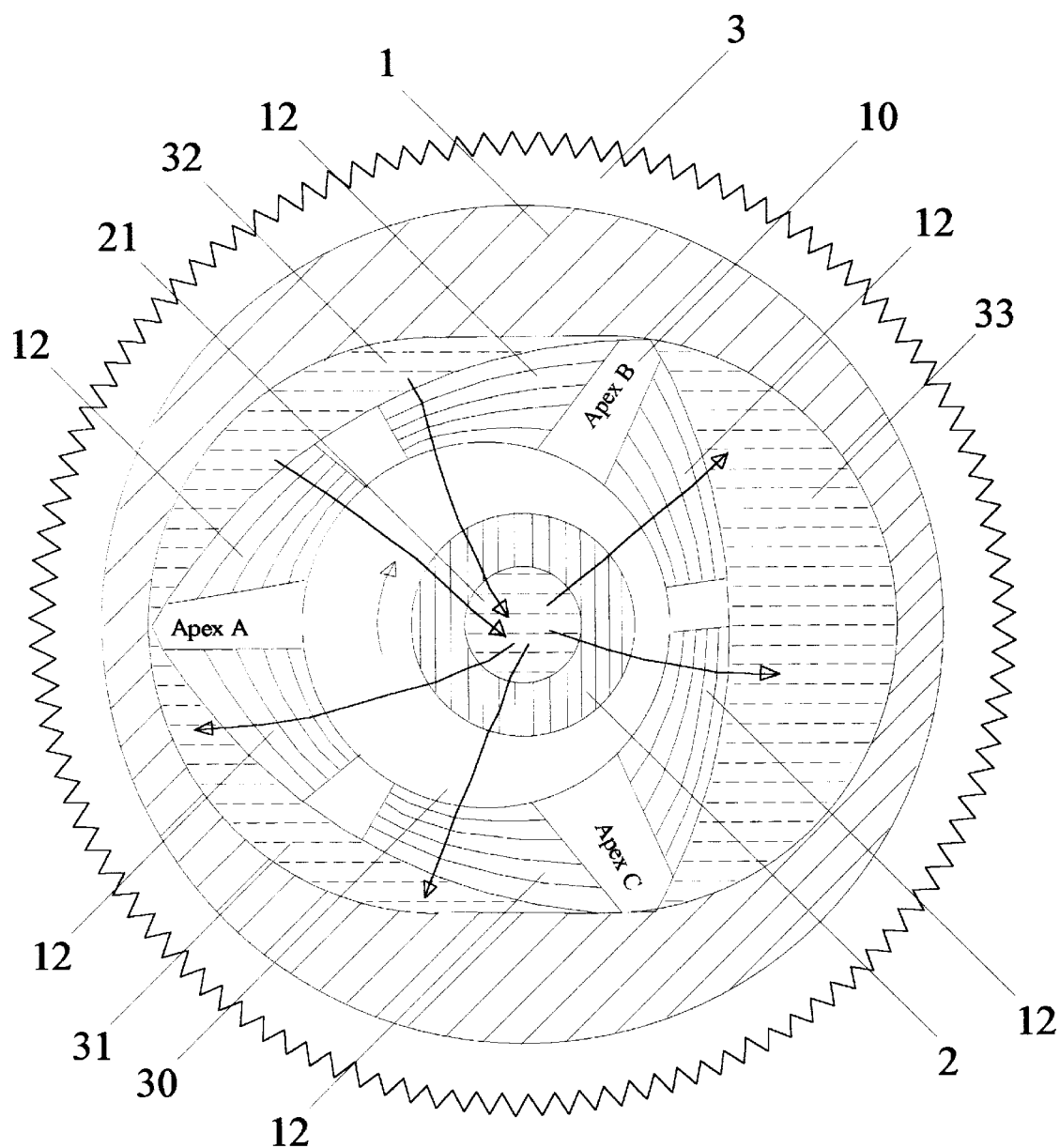
FIG. 2B is the side cut-away view of the rotor, the elliptical housing, the fluid chambers, the input gear, the eccentric shaft, and the main shaft in the position defined as "180 degrees" of the rotor's rotation.

During the first 90 degrees of rotor revolution from the position depicted in FIG.2, the rotor 10 displaces the fluid from the fluid chambers 32 and 34 into the fluid chamber 33 and a newly formed fluid chamber 31 as presented by arrows shown in FIG. 2A. The fluid is displaced from the chambers 32 and 34 which decrease in volume into the chambers 33 and 31 which increase in volume. As shown in FIG. 3, all of the fluid passages 12, 22, 23, and 24 are aligned to enable the fluid to flow from the decreasing fluid chambers 32 and 34 into the opening 21 in the piston 20 and flow back into the expanding fluid chambers 31 and 33. During the next 90 degrees of the rotor's 10 revolution (from 90 to 180 degrees) the fluid is completely displaced from the fluid chamber 34 which ceases to exist as shown in FIG. 2B. Also, the fluid is displaced from the decreasing chamber 32 into the increasing chambers 31 and 33 as presented by the arrows shown in FIG. 2B.

Figure 2C:
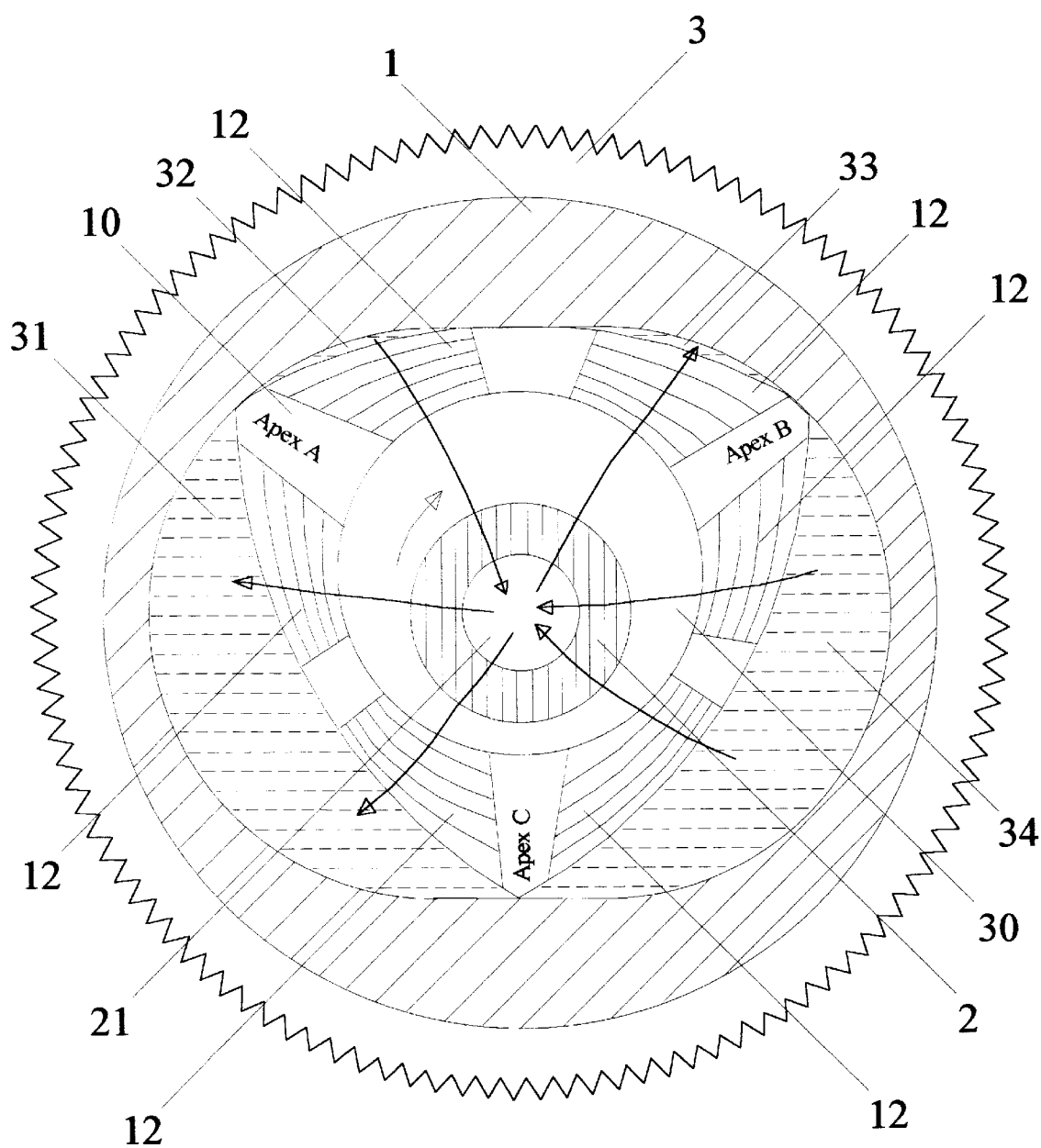
FIG. 2C is the side cut-away view of the rotor, the elliptical housing, the fluid chambers, the input gear, the eccentric shaft, and the main shaft in the position defined as "270 degrees" of the rotor's rotation.
Figure 2D:
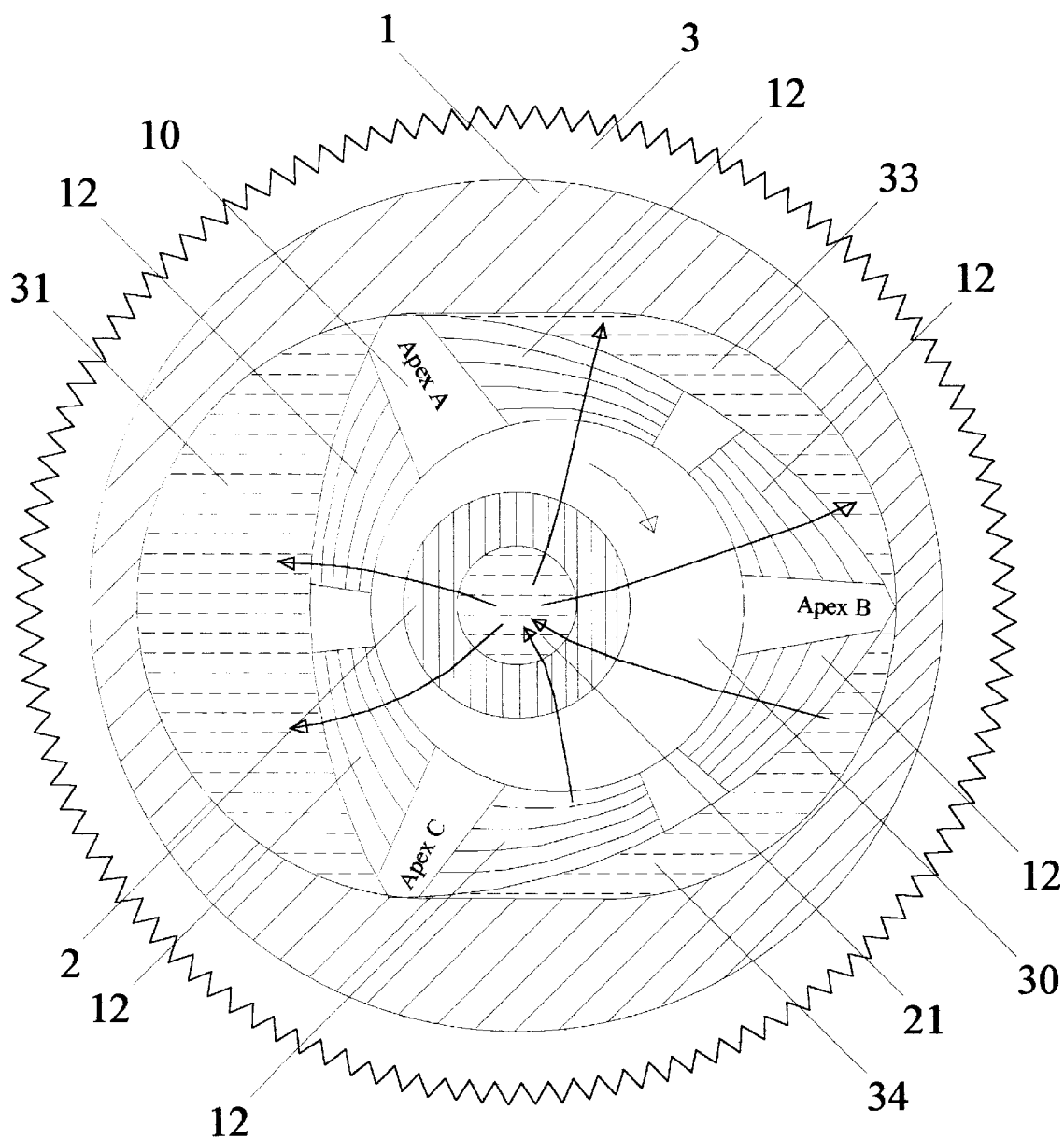
FIG. 2D is the side cut-away view of the rotor, the elliptical housing, the fluid chambers, the input gear, the eccentric shaft, and the main shaft in the position defined as "360 degrees" of the rotor's rotation.

As shown in FIG. 2B, after 180 degrees of the rotor's 10 revolution, the chamber 33 reaches its maximum volume, the chamber 32 has a significantly decreased volume, and chamber 31 has a significantly increased volume. During the next 90 degrees of the rotor's 10 revolution (from 180 to 270 degrees) the fluid is displaced from the chambers 34 and 32 into the into the chamber 31 and the newly formed chamber 33. The volumes of the chambers 31 and 33 are increasing and receiving the fluid displaced from the chambers 34 and 32 as shown in FIG. 2C. During the next 90 degrees of the rotor's 10 revolution (from 270 to 360 degrees) the fluid is completely displaced from the chamber 32 which disappears as shown in FIG. 2D. Also, the fluid is displaced from the decreasing chamber 34 into the chamber 33 and the chamber 31 which reaches its maximum volume as shown in FIG. 2D.

In sum, during the above described process, the fluid is simply circulated from the chambers whose volumes are decreasing into the chambers whose volumes are increasing. Since the volumes of the fluid chambers, the fluid passages, and fluid itself are always the same there is no compression of the fluid during this process. Consequently, there is no pressure exerted onto the housing's 1 walls and the housing 1 remains stationary. It is to be understood that all fluid passages 12, 22, 23, and 24 are made in a manner as shown in FIGS. 3, 4, 4A, 6, and 6A which does not allow the flow of fluid between any of the fluid passages which are positioned parallel to each other, i.e. the fluid can flow only between passages which are vertically adjacent to each other.

When the clutch lever is depressed, it allows the lever arm 42, the push rod 43, and the contact ball 44 to move outwards and enables the force of the retracting spring 25 to push the shifting piston 20 in the same direction. As the shifting piston 20 slides outwards, its fluid passages 24 start to disalign with the fluid passages 23 in the main shaft. This disalignment results in a lesser area available for fluid flow between the fluid passages 24 and 23 which further results in more restricted fluid flow and increased fluid pressure within the diminishing fluid chambers. As the fluid pressure is raised, it starts acting against the housing's 1 walls and, consequently, starts forcing the housing 1 to rotate in the same direction as the rotor 10. As a result, the power flow is gradually applied and transmitted onto the main shaft 2 which is firmly connected to the housing 1.

As the contact area between the fluid passages 24 and 23 decreases, the force required to displace the fluid increases which further causes the fluid pressure to increase. The increased fluid pressure exerts more force on the housing's 1 walls and forces the housing 1 to rotate faster and faster. When the force of the retracting spring 25 displaces the piston 20 to the point where its fluid passages 24 do not have any contact with the fluid passages 23 in the main shaft 2, the fluid circulation is completely cut off and the fluid is trapped in the fluid chambers. This, in turn, causes the housing 1 to rotate at the same speed as the rotor 10 and establish the unrestricted full-scale power flow to the main shaft 20 which further transmits the driving force to the transmission drive gears.

Figure 4B:
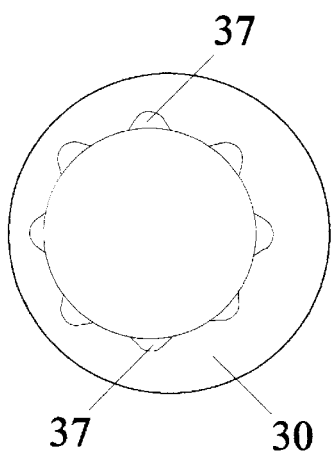
FIG. 4B is the cut-away view of the eccentric shaft along the dotted line A—A shown in FIG. 4A.

During the last stage of the piston's 10 displacement the lock-up balls 26 are pushed outwards by the piston's raised section 29. As shown hi FIG. 4B, the inner opening of the eccentric shaft 30 has a plurality of notches 37 wherein the lock-up balls are inserted by the piston's raised section 29 as soon as the housing's 1 rotating speed reaches the rotor's 10 rotating speed. When the piston 20 comes to its ultimate outward position as shown in FIG. 3B, the rotor 10 and the housing 1 are locked by the fluid trapped in the fluid chambers while the eccentric shaft 30 and the main shaft 2 are joined by the lock-up balls 26 which are intended to support the lock-up performed by the fluid and compensate for possible fluid leaks within the housing 1.

When the lever clutch is pressed, it forces the lever arm 42 to exert the force onto the push rod 43 which over the contact ball 44 forces the shifting piston 20 to move inwards and press against the retracting spring 25. As shown in FIG. 3A, the lock-up balls are pushed back into their openings 27 in the main shaft 2 and the depressed section 28 in the piston 20. As soon as the fluid passages 24 in the piston 20 start overlapping with the fluid passages 23 in the main shaft 2, the fluid circulation is enabled again and the fluid pressure in the fluid chambers starts to decrease. The decreased fluid pressure starts exerting less force on the housing's 1 walls and causes the housing's 1 rotating speed to drop below the rotor's 10 rotating speed.

As the piston 20 is pushed inwards, it results in more and more contact area between the fluid passages 23 and 24 and causes the fluid pressure to rapidly decrease. The decrease of the fluid pressure results in lesser force exerted on the housing's walls and, consequently, slower rotation of the housing 1 and the main shaft 2. The process of this gradual disengagement lasts until the piston 20 reaches the position where its fluid passages 24 completely align with the fluid passages 23 in the main shaft 2 as shown in FIG. 3. At this instant, the unrestricted fluid circulation is allowed again and the power flow between the engine and the transmission is completely cut off.

Figure 8:
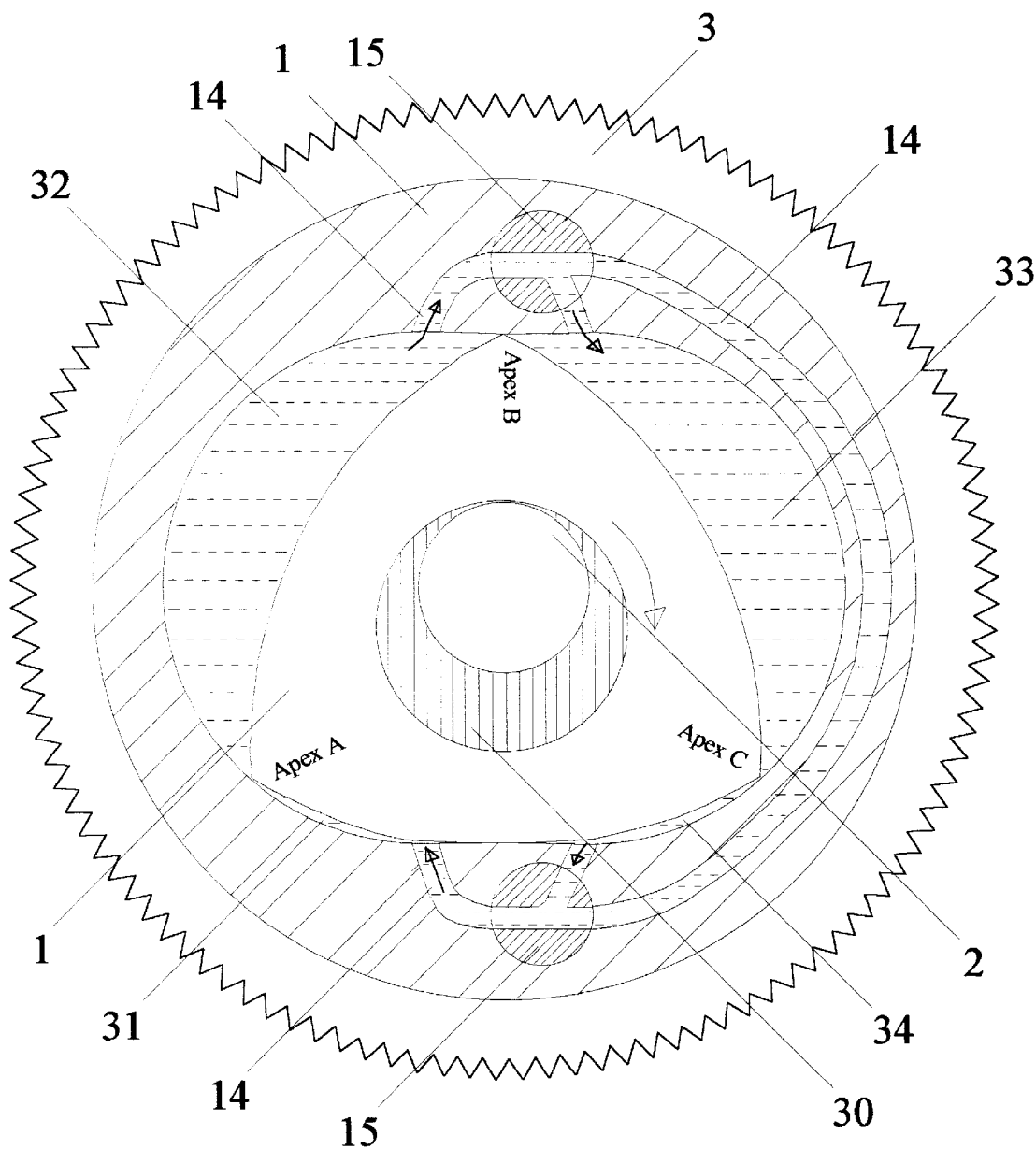
FIG. 8 is the side cut-away view of the rotor, the elliptical housing, the fluid chambers, the input gear, the eccentric shaft, the main shaft, and the fluid valves in the position for the second embodiment wherein the fluid valves are hi their opened positions.
Figure 8A:
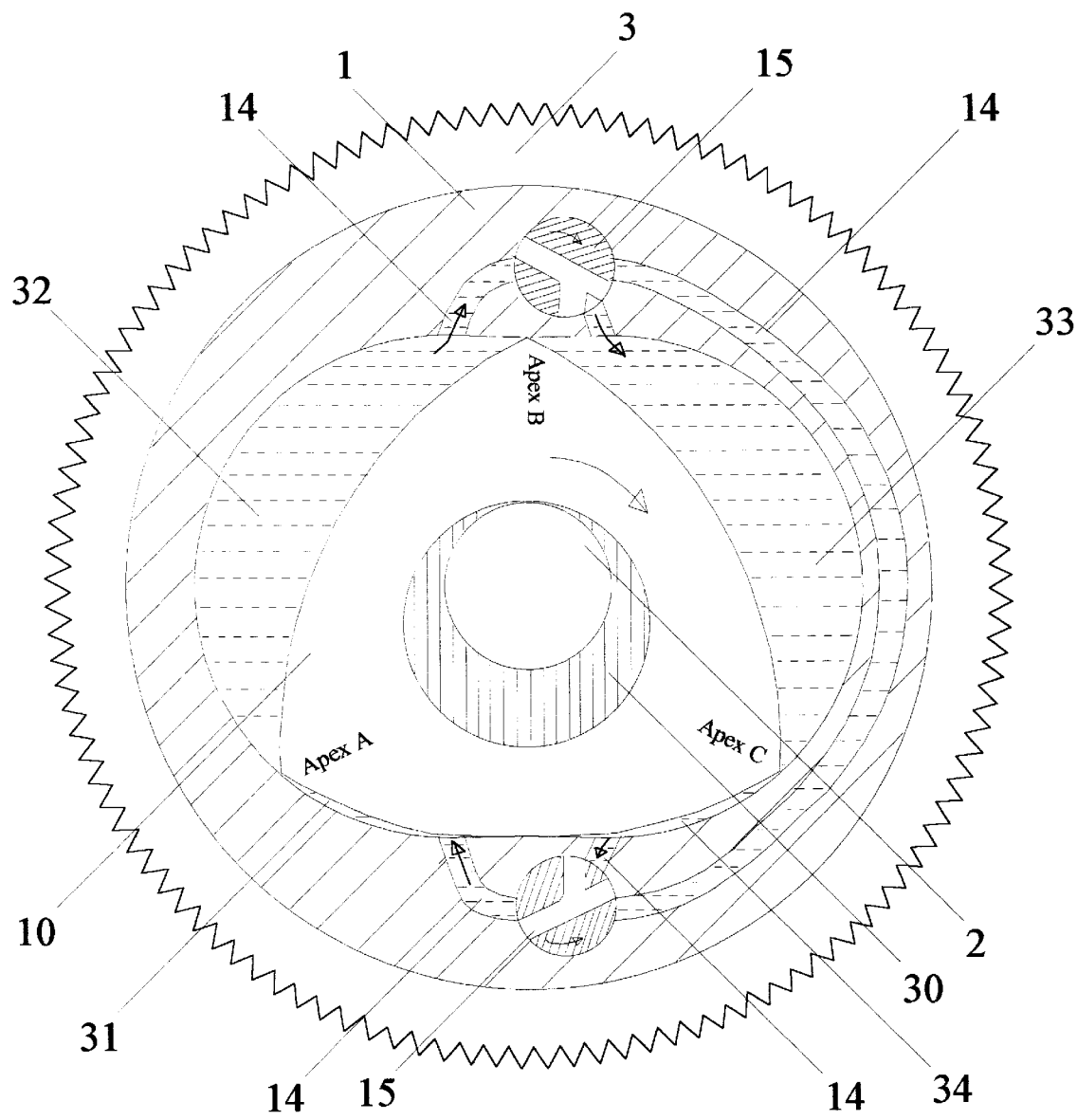
FIG. 8A is the side cut-away view of the rotor, the elliptical housing, the fluid chambers, the input gear, the eccentric shaft, the main shaft, and the fluid valves in the position for the second embodiment wherein the fluid valves are in their closed positions.
Figure 9:
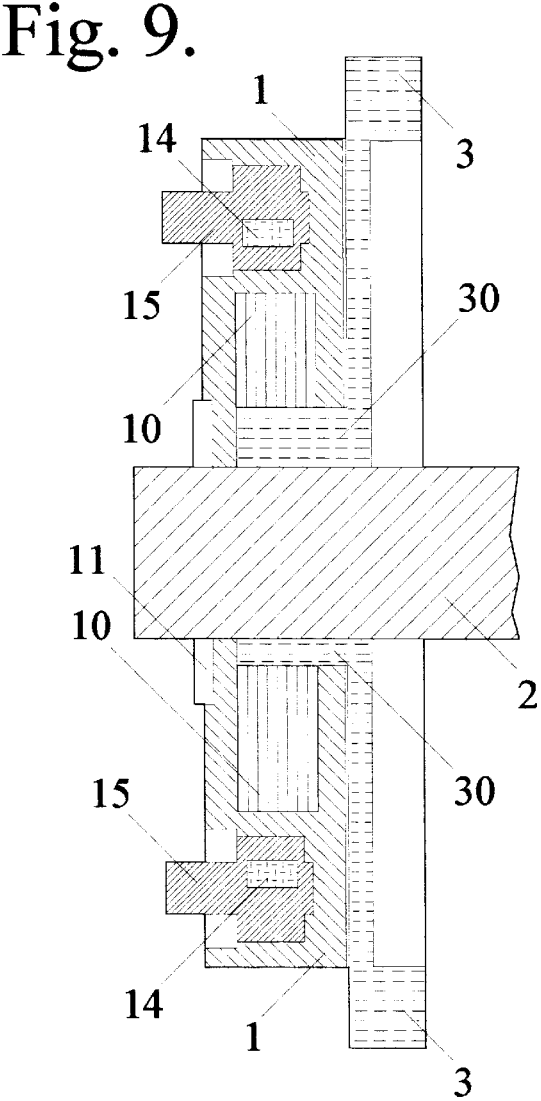
FIG. 9 is the rear cut-away view of the invention for the second embodiment showing the position of the fluid valves when the clutch is completely disengaged.
Figure 9A:
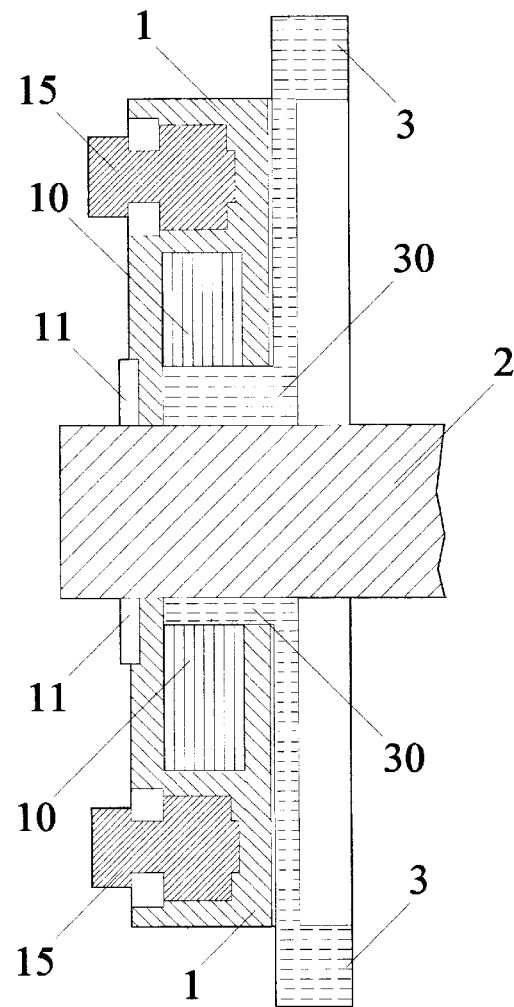
FIG. 9A is the rear cut-away view of the invention for the second embodiment showing the position of the fluid valves when the clutch is completely engaged.

As shown in FIGS. 8, 8A, 9, and 9A, the second embodiment of the present invention comprises the housing 1, the rotor 10, the input gear 3, the eccentric shaft 30, the main shaft 2, two rotary fluid valves 15 and a connecting bolt 11. The fluid passages 14 are made through the housing's 1 walls and they connect all of the fluid chambers 31, 32, 33, and 34 as shown in FIGS. 8 and 8A. The rotary fluid valves 15 are also provided within the housing's 1 walls as also shown in FIGS. 8 and 8A and their function is to restrict the flow of fluid between all of the fluid chambers. As shown in FIGS. 9 and 9A, the eccentric shaft 30 is firmly connected to the input gear 3 and the housing 1 is firmly connected to the main shaft 2 both through their contact areas and by the connecting bolt 11.

According to the process of the present invention for the second embodiment, the formation of the fluid chambers 31, 32, 33, and 34 as the result of the rotor's 10 rotation and the fluid displacement between these chambers is identical to the above described process for the first embodiment of the present invention as shown in FIGS. 2A, 2B, 2C and 2D. It is also assumed that the power flow from the engine and to the transmission is identical as described above. Unlike in the case of the first embodiment, the fluid circulation between the fluid chambers in the second embodiment of the present invention is performed through the fluid passages 14 shown in FIGS. 8 and 8A.

When the fluid valves 15 are in positions as shown in FIGS. 8 and 9, the fluid is allowed to freely circulate between the fluid chambers 31, 32, 33, and 34 and the power flow is completely cut off When the valves 15 are turned, they start closing the fluid passages 14 and thereby restricting the flow of fluid between the fluid chambers which cause the fluid pressure to rise and act against the housing's 1 walls. The pressure exerted on the housing walls forces the housing 1 to rotate in the same direction as the rotor 10. The housing's 1 rotating speed gradually increases and becomes equal to the rotor's 10 rotating speed at the point when the valves 15 are completely closed and the fluid is trapped in the fluid chambers as shown in FIGS. 8A and 9A. At this point, the unrestricted full-scale power flow is established between the engine and the transmission.

When the fluid valves 15 are rotated back, they open the fluid connections in the fluid passages 14 and allow the flow of fluid between the chambers. This, in turn, results in the decreased fluid pressure which allows the housing 1 to rotate slower than the rotor 10. Gradual opening of the valves 15 results in gradual disconnection of the power flow until the point when the valves 15 are completely open and the fluid circulation is completely unrestricted as shown in FIG. 8. At this instant, the power flow between the engine and the transmission is completely cut off again.

It is to be understood that the present invention has been described in relation to the particular embodiments, herein chosen for the purpose of illustration, and that the claims are intended to cover all changes and modifications, apparent to those skilled in the art, which do not constitute departure from the scope and spirit of the invention.

What is claimed is:

1. A hydraulically operated clutch for connecting and disconnecting a driving force between a drive and a driven member and gradually applying a load to the driven member in engine-propelled vehicles, the clutch comprising:

a housing, the housing having an internal elliptical opening and first and second openings provided in side walls of the housing;

a triangular rotor installed in the internal elliptical opening of the housing, the triangular rotor having a plurality of radial openings and a central opening;

a power input member, the power input member connected to an engine;

an eccentric shaft having a central opening, a plurality of radial openings extending outward from the central opening, and a plurality of internally engraved notches in the central opening, the eccentric shaft firmly connected to the power input member, extending through the first opening in the housing, and being rotatably inserted in the central opening of the triangular rotor;

a main shaft having first and second ends, a central opening, a first set of radial openings and a second set of radial openings wherein both said sets of the radial openings extending outward from the central opening, the main shaft rotatably inserted through the central opening in the eccentric shaft and extending through the first and second openings in the housing, wherein the second end of the main shaft is firmly connected to the second opening in the housing;

a shifting piston having first and second ends, a depressed section, a central opening, and a plurality of radial openings wherein a plurality of radial openings extend outward from the central opening, the shifting piston slidably received within the central opening in the main shaft;

a spring for operating the shifting piston, the spring located within the central opening of the main shaft and adjacent to the shifting piston;

a cover unit for enclosing the second end of the main shaft and providing a connection between the main shaft and the housing, said cover unit having a central opening adjacent to the central opening of the main shaft and being firmly connected to the housing;

a unit for driving the shifting piston, said unit slidably received in the central opening of the cover unit;

a unit for enclosing the clutch, said unit comprising a sleeve for supporting the unit for driving the shifting piston;

a means for operating the unit for driving the shifting piston, said means incorporated into the unit for enclosing the clutch;

a plurality of lock-up means slidably received within the first set of radial openings in the main shaft, wherein the lock-up means are displaced by the shifting piston into the internally engraved notches in the central opening of the eccentric shaft to provide a firm connection between the eccentric shaft and the main shaft.

2. The hydraulically operated clutch of claim 1, wherein the first end of the main shaft extends into an adjacent transmission.

3. The hydraulically operated clutch of claim 1, wherein the plurality of radial openings in the rotor and eccentric shaft are used as fluid passages which enable circulation of an operating fluid.

4. The hydraulically operated clutch of claim 1, wherein the plurality of radial openings in the shifting piston and the plurality of second radial openings in the main shaft are used as the fluid passages which enable circulation of the operating fluid.

5. The hydraulically operated clutch of claim 1, wherein the rotor orbits within the internal elliptical opening of the housing and alternately forms a plurality of fluid chambers.

6. The hydraulically operated clutch of claim 1, wherein all radial openings, the central opening in the shifting piston, and the plurality of fluid chambers in the internal elliptical opening of the housing are all permanently filled with the operating fluid.

7. The hydraulically operated clutch of claim 1, wherein the shifting piston gradually restricts flow of the operating fluid between the fluid chambers.

8. The hydraulically operated clutch of claim 1, wherein the lock-up means mechanically collect the eccentric shaft and the main shaft during a full-scale power flow.

9. A hydraulically operated device for connecting and disconnecting a driving force and gradually applying a load to a driven member in engine-propelled vehicles, the device comprising:

a housing, the housing having an internal elliptical opening and first and second openings provided in side walls of the housing;

a triangular rotor installed in the internal elliptical opening of the housing, the triangular rotor having a plurality of radial openings and a central opening;

an input gear, the input gear connected to an engine;

an eccentric shaft having a central opening, a plurality of radial openings extending outward from the central opening, and a plurality of internally engraved notches in the central opening, the eccentric shaft firmly connected to the power input member, extending through the first opening in the housing, and being rotatably inserted into the central opening of the triangular rotor;

a main shaft having first and second ends, a central opening, a first set of radial openings and a second set of radial openings wherein both said sets of the radial openings extending outward from the central opening, the main shaft rotatably received in the central opening of the eccentric shaft and extending through the first and second openings in the housing, wherein the second end of the main shaft is firmly connected to the second opening in the housing;

a shifting piston having first and second ends, a depressed section, a central opening, and a plurality of radial openings wherein a plurality of radial openings extend outward from the central opening, the shifting piston slidably received within the central opening in the main shaft;

a spring for operating the shifting piston, the spring located within the central opening of the main shaft and adjacent to the shifting piston;

a cover unit for enclosing the second end of the main shaft and providing a connection between the main shaft and the housing, said cover unit having a central opening adjacent to the central opening of the main shaft and being connected to the housing;

a push rod for driving the shifting piston, push rod slidably received in the central opening of the cover unit;

a contact ball, the contact ball provided between the push rod and the shifting piston;

a unit for enclosing the entire device, said unit comprising a sleeve for supporting and guiding the push rod;

a lever arm for operating the push rod, said lever arm incorporated into the unit for enclosing the entire device;

a plurality of lock-up balls slidably received with the first set of radial openings in the main shaft, wherein the lock-up are displaced by the shifting piston into the internally engraved notches in the central opening of the eccentric shaft to provide a firm connection between the eccentric shaft and the main shaft during the time when the device is fully engaged.

10. The hydraulically operated device of claim 9, wherein the first end of the main shaft extends into an adjacent transmission and wherein driven transmission gears are mounted onto the main shaft.

11. The hydraulically operated device of claim 9, wherein the plurality of radial openings in the rotor and eccentric shaft are vertically aligned and used as fluid passages which enable circulation of an operating fluid.

12. The hydraulically operated device of claim 9, wherein the plurality of radial openings in the shifting piston and the plurality of second radial openings in the main shaft are used as the fluid passages which enable circulation of the operating fluid.

13. The hydraulically operated device of claim 9, wherein the rotor orbits within the internal elliptical opening of the housing and during its orbiting alternately forms a plurality of fluid chambers.

14. The hydraulically operated device of claim 9, wherein all radial openings, the central opening in the shifting piston, and the plurality of fluid chambers in the internal elliptical opening of the housing are all permanently filled with the operating fluid and wherein the shifting piston gradually restricts flow of the operating fluid between the fluid chambers.

15. The hydraulically operated device of claim 9, wherein the lock-up means mechanically connect the eccentric shaft and the main shaft during the period when the fluid circulation is completely cut off.

16. A hydraulically operated clutch for connecting and disconnecting a driving force between a drive and a driven member and gradually applying a load to the driven member in engine-propelled vehicles, the clutch comprising:

a housing, the housing having an internal elliptical opening and first and second openings provided in side walls of the housing;

a triangular rotor installed in the internal elliptical opening of the lousing, the triangular rotor having a central opening and orbiting in the internal elliptical opening of the housing so as to alternately form a plurality of fluid chambers in the internal elliptical opening of the housing;

a power input member, the power input member connected to an engine;

an eccentric shaft having a central opening, the eccentric shaft firmly connected to the power input member, extending through the first opening in the housing, and being rotatably received in the central opening of the triangular rotor;

a main shaft having first and second ends, the main shaft rotatably received in the central opening in the eccentric shaft and extending through the first and second openings in the housing, wherein the second end of the main shaft is firmly connected to the second opening in the housing;

a plurality of fluid passages, the fluid passages connecting all of the fluid chambers and enabling fluid communications between said fluid chambers;

a means for restricting and stopping fluid flow, said means being capable to gradually limit and completely cut off the fluid flow between the fluid chambers;

a means for firmly fastening the shaft and the housing.

17. The hydraulically operated clutch of claim 15, wherein the first end of the main shaft extends into an adjacent transmission and wherein driven transmission gears are mounted onto the main shaft.

* * * * *